United States Patent [19]

Long

[11] 3,844,518

[45] Oct. 29, 1974

[54] LEVELING SUPPORT STRUCTURE FOR DISHWASHER

[75] Inventor: Olan L. Long, Columbus, Ohio

[73] Assignee: Westinghouse Electric Corporation, Pittsburgh, Pa.

[22] Filed: Apr. 18, 1973

[21] Appl. No.: 352,858

[52] U.S. Cl.................. 248/188.4, 85/32 V, 85/33
[51] Int. Cl............................................. F16b 41/00
[58] Field of Search ...... 85/32 V, 33; 151/24, 25 R, 151/25 A, 26; 248/188.4, 406, 408

[56] References Cited
UNITED STATES PATENTS

| | | | |
|---|---|---|---|
| 1,589,307 | 6/1926 | Svebilius | 85/33 |
| 2,608,794 | 9/1952 | Matter | 248/188.4 |
| 2,725,437 | 11/1955 | Fields et al. | 85/33 |
| 2,874,877 | 2/1959 | Spencer | 85/33 |
| 3,229,942 | 1/1966 | Nalle | 248/188.4 |
| 3,393,598 | 7/1968 | Bettinger | 85/33 |
| 3,570,836 | 3/1971 | Pettavel | 85/33 |

FOREIGN PATENTS OR APPLICATIONS

| | | | |
|---|---|---|---|
| 830,717 | 2/1952 | Germany | 85/33 |
| 471,299 | 5/1969 | Switzerland | 85/32 V |

*Primary Examiner*—Marion Parsons, Jr.
*Attorney, Agent, or Firm*—F. A. Winans

[57] ABSTRACT

A leveling support structure for an appliance is shown which permits relatively easy vertical adjustment without the use of tools. The support structure includes a generally well known leveling screw having an enlarged flat head for engagement with the floor and a threaded shank which is received within a vertical sleeve like contour formed within a vertical wall of a support leg. The effective opening into the sleeve is larger than the O.D. of the threaded shank so that the leveling screw is free to slide vertically within the sleeve. The inner face of the sleeve includes an arcuate portion which has thread engaging projections whereas the opposing arcuate face is smooth. A U-shaped leaf spring member is interposed between the smooth wall of the sleeve and the leveling screw with the free ends of the spring extending exteriorally of the sleeve for manual access. The normal bias of the spring urges the leveling screw into threaded engagement with the projections on the sleeve so that axially turning the leveling screw screws it into or out of the leg. For rapid adjustment the spring member can be manually compressed to release the threaded engagement thereby permitting free axial movement of the bolt within the sleeve member. Once the proper extension of the bolt from the leg has been attained, the normal bias of the spring member on the leveling screw is sufficient to maintain it in the set position.

7 Claims, 4 Drawing Figures

PATENTED OCT 29 1974   3,844,518

LEVELING SUPPORT STRUCTURE FOR DISHWASHER

BACKGROUND OF THE INVENTION

1. Field of the Invention

This invention relates to a leveling screw assembly for a dishwasher and more specifically to such an assembly which permits easy and rapid adjustment without requiring tools and is relatively securely maintained at the adjusted position.

2. Description of the Prior Art

Structure for supporting an appliance in a level position is well known in the art and generally includes a threaded leveling screw having an enlarged head supported from each leg or bottom corner of an appliance housing. In the dishwasher art, the dishwashing tub is supported on four corner legs with other structure motor, pump, valve, wiring and electrical connections, etc. appropriately mounted thereon in the space between the tub and the floor. It is often required to install dishwashers in the space between existing kitchen cabinets and in some instances, beneath a countertop. Under these circumstances and after the dishwasher has been properly positioned it is extremely difficult to adjust the rear legs to level the dishwasher because of their relative inaccessability. The leveling adjustment is further aggravated if a tool is required to turn the leveling screw for screwing it in or out.

SUMMARY OF THE INVENTION

The present invention provides leveling support structure that is easily adjusted to the proper position without the use of a tool and without the necessity of turning the leveling screw, although it still permits this type of adjustment, by permitting free axial telescopic-type movement of the leveling screw relative to the leg and maintaining the screw in the adjusted position. Thus, the leveling screw is received in a vertical sleeve formed in each leg of the dishwasher with the effective diameter of the sleeve being larger than the O.D. of the leveling screw thereby permitting free axial relative movement. One arcuate portion of the interior face of the sleeve defines thread engaging projections whereas the opposing arcuate face is relatively smooth. A spring having manually accessible ends extending from the sleeve is interposed between the leveling screw and the smooth wall of the sleeve to normally bias the leveling screw into engagement with the projections. The spring is retained against vertical movement and also defines thread engaging projections so that both sides of the bolt are threadably engaged when the spring is in its normal biasing position. In this manner with the spring member in its normal biasing position the leveling screw can be turned axially to either screw into or out of the sleeve or, in the alternative and for relatively fast and easy adjustment, the spring can be manually compressed to a non-engaging position whereupon the leveling screw can be directly axially retracted or inserted without any turning.

DESCRIPTION OF THE PREFERRED EMBODIMENTS

Figure 1:
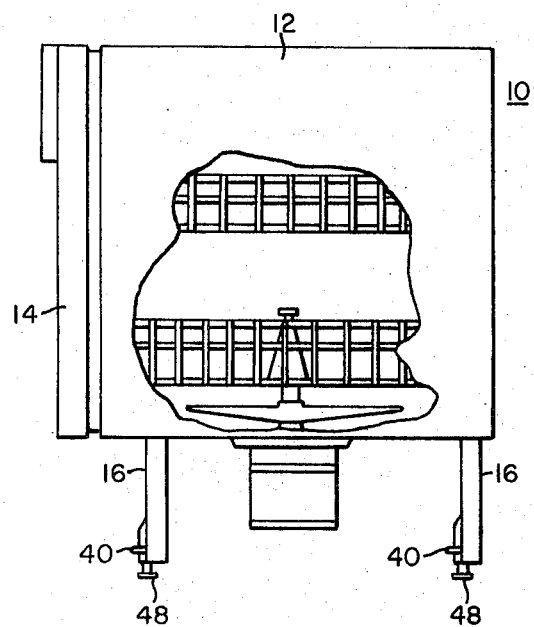
FIG. 1 is a side elevational view of a dishwasher supported on leg structure.
Figure 2:
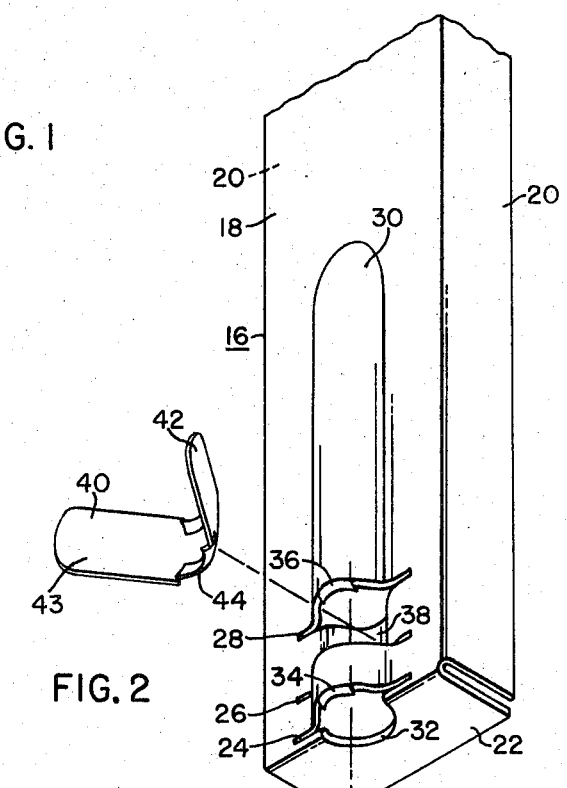
FIG. 2 is an exploded perspective view of the leveling support structure of the present invention.

Referring initially to FIG. 1, the present invention is shown as a support structure for a dishwasher 10 which generally comprises a box-like front-opening tub 12 defining a dishwashing cavity closeable by a hingedly mounted front door 14. The tub is supported in a generally elevated position above the floor, to provide a space to accommodate the motor, pumps, valves, etc., below the tub by four support legs 16. The support legs are attached to the tub generally adjacent each corner, and as more clearly seen in FIG. 2, formed by a metal channel member having a vertical front wall 18 and opposing side walls 20 providing sufficient strength and rigidity to support the tub. The bottom end of the front wall is bent inwardly to form a planar end 22 generally parallel to the floor. Normally, heretofore, the end 22 would be drilled or punched to provide an aperture and a nut would be welded in alignment with the aperture to receive a threaded leveling screw. However, in the preferred form of the instant invention, the front wall 18 of the leg 16 is slit along at least three parallel spatially separated lines, which are also generally perpendicular to the longitudinal axis of the leg 16. As is seen in FIG. 2, one slit 24 is generally adjacent the bend line forming the end 22, with the remaining two slits 26 and 28 being in substantial alignment and at selected distances thereabove. In a pressing operation, the area of the front wall 18 between the slit 24-26 is formed arcuately outwardly, between slit 26-28 arcuately inwardly, and above slit 28 again arcuately outwardly terminating at its uppermost end in a contoured portion blending into the normal plane of the front wall as at 30.

Figure 3:
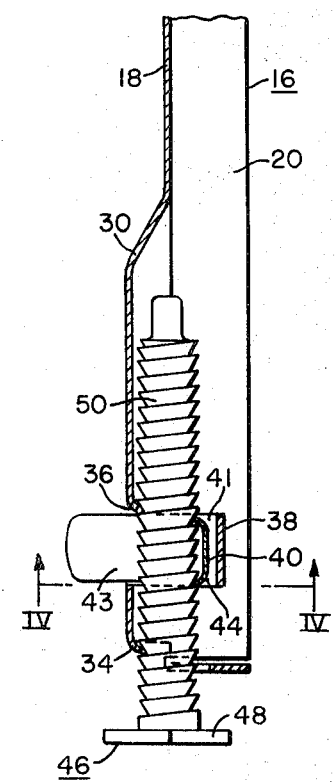
FIG. 3 is a cross-sectional elevational view of the leveling support structure of FIG. 2 in an assembled position.

The bottom end 22 is arcuately notched, as at 32, adjacent the slit 24 which, in cooperation with the above described arcuately formed front wall of the leg defines a sleeve-like configuration for receiving the threaded shank of a leveling screw. In this respect, it is to be noted with reference to FIG. 3, that the edges of the outwardly formed front wall formed by slits 24 and 28 are bent rearwardly to provide thread engaging projections 34, 36 respectively along their arcuate extent.

Further, the wall of the inwardly formed area 38, between slits 26 and 28 is relatively smooth. A generally U-shaped leaf-spring member 40 is provided for assembly within this area 38 with the width of the spring being slightly less than the distance between the slits 26, 28.

Figure 4:
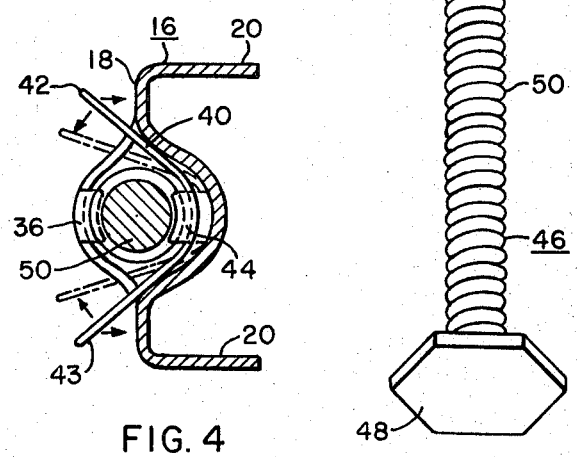
FIG. 4 is a cross-sectional plan view taken along lines IV—IV of FIG. 3.

The leaf spring 40 has an inherent resiliency to assume an arcuate apex of greater radius than the radius of the arcuate contour of area 38 so that, when the arcuate portions are placed in adjacency, and the spring 40 is in its least stressed position within the assembly, the spring abuts the leg at the juncture between the arcuate area 38 and the planar front wall 18 (See FIG. 4) providing a space 41 between the spring 40 and the arcuate extent of area 38. The free ends 42, 43 of the spring extend forwardly of the front wall 18 of the leg for manual accessibility and, when manually squeezed together cause the radius of the spring apex to be reduced to the extent that it will at least conform to the arc of area 38 whereupon the spring can be moved rearwardly into previous space 41.

Referring again to FIG. 3, it is seen that at least the bottom edge of the spring 40 defines a projection 44 extending along the arcuate apex thereof which engages the threads of the bolt when in its least stressed position but is freed of contacting the threads when the spring is manually squeezed and moved rearwardly as above described. A well known leveling screw 46 having a flat head 48 providing a load bearing surface and which has a hexagonal periphery to facilitate turning with a tool and also having a threaded shank portion 50, is inserted in the sleeve-like contour of the leg just described. In this respect it should be noted that the effective largest diameter of the bolt receiving sleeve, i.e., the minimum distance between diametrically opposed thread engaging projections 44 and 34–36 as viewed in FIG. 4, when the spring is biased to minimize space 41, is larger than the outer diameter of the threaded shank 50 so that under these circumstances, the bolt can be freely telescopically moved along its longitudinal axis. However, once the spring is in place and the bolt inserted in the sleeve, the normal resiliency of the spring causes it to push against the bolt which in turn causes the projections 34, 36, 44 to relatively tightly engage the threads of the bolt 46. As thus assembled, it is apparent that the bolt can still be adjusted by axially turning. Further, it is apparent that due to the directional orientation of the thread engaging projections 34, 36, 44, the bolt can be withdrawn, as by ratcheting a thread at a time, without first manually compressing the spring; however, its retraction under these conditions can only be accomplished through screwing the bolt.

Thus, the leveling screw can be easily adjusted to the proper extension by manually compressing the spring to a position where the bolt can be freely retracted or extended whereupon the spring can then be released and its abutment with the leveling screw forces it into threaded engagement with the projections on one face of the sleeve. Also, the spring member itself having a thread engaging projection, distributes the support for the weight of the machine about the bolt thread, as the spring is prevented from vertical movement by abutment between its top edge and the outwardly formed edge of slit 36.

I claim:

1. Leveling support structure for a dishwasher or the like comprising:

a leveling screw having a threaded shank portion and an enlarged head portion;

means for threadably engaging said shank portion in a relatively freely rotatable manner permitting screwing said leveling screw within said means; said engaging means defining an aperture having a diameter greater than the outer diameter of said shank portion, said aperture having a first arcuate portion providing thread engaging means;

spring means interposed between the shank portion of said screw and a second arcuate portion of said aperture diametrically opposed to said thread engaging means to normally urge said threaded shank portion and said thread engaging means into weight supporting engagement, said spring means comprising a U-shaped leaf spring having a generally arcuate apex disposed between said shank portion and said second arcuate portion of said aperture, said apex having a greater diameter than said second arcuate portion whereby said spring means assumes a first position forcing said shank portion into threaded engagement with said first arcuate area and defining a space between said apex and said second arcuate area; and, means for manually releasing said shank portion from said spring means permitting relatively free longitudinal axial movement of said leveling screw within said aperture to obtain the desired extension, said releasing means comprising the freely extending ends of said leaf spring for manual movement towards one another to effectively reduce the diameter of said apex to permit said apex to move within said space a distance sufficient to release said threaded engagement of said shank portion whereupon reengagement of said spring means and said shank portion re-establishes said weight supporting engagement.

2. Leveling support structure according to claim 1 wherein said aperture for receiving said threaded shank portion is defined by opposing arcuate portions formed in a substantially vertical wall of said support structure including first and second outwardly formed arcuate areas each having a longitudinal axial extent and separated by an oppositely formed arcuate area also having a longitudinal axial extent, and wherein said spring means is disposed within said oppositely formed arcuate area.

3. Leveling support structure according to claim 2 wherein each of said outwardly formed arcuate areas terminates in a bottom arcuate edge substantially perpendicular to the axis of said threaded shank, said edge providing an inwardly projecting thread engaging portion.

4. Structure according to claim 3 wherein the lower edge of said spring means, at least through the extent of its arcuate apex, defines a thread engaging projection whereby said threaded shank portion is threadably engaged on diametrically opposing surfaces.

5. Structure according to claim 4 wherein said space between the apex of said spring and said arcuate area is sufficient to permit disengagement of all of said thread engaging projections of said arcuate edges and said spring from said shank portion when said ends of said spring are manually moved towards one another to decrease the arcuate apex of said spring to a diameter of at least no greater than the diameter of said oppositely formed arcuate area whereby said spring and said arcuate area can be placed in face to face contact, releasing said leveling leg for free longitudinal axial movement.

6. Structure according to claim 5 wherein the width of said spring is substantially equal to the longitudinal extent of said oppositely formed arcuate area whereby said spring abuts the arcuate edge of said first outwardly formed arcuate area when said projection of said spring engages said threaded shank portion whereby said spring shares in supporting the weight of said appliance.

7. Structure according to claim 6 wherein all said thread engaging projections extend radially inwardly downwardly providing a camming surface permitting longitudinal axial movement of said leveling leg to extend it in a ratching manner without the prior manual release of said spring means.

* * * * *